US011370629B2

(12) United States Patent
Shourvarzi et al.

(10) Patent No.: US 11,370,629 B2
(45) Date of Patent: Jun. 28, 2022

(54) METHOD FOR PRINTING A WEB OF PACKAGING MATERIAL AND AN APPARATUS THEREOF

(71) Applicant: Tetra Laval Holdings & Finance S.A., Pully (CH)

(72) Inventors: Keyvan Shourvarzi, Malmö (SE); Anna Harder, Hjärup (SE); Paolo Scarabelli, Reggio Emilia (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 17/415,381

(22) PCT Filed: Dec. 16, 2019

(86) PCT No.: PCT/EP2019/085307
§ 371 (c)(1),
(2) Date: Jun. 17, 2021

(87) PCT Pub. No.: WO2020/127018
PCT Pub. Date: Jun. 25, 2020

(65) Prior Publication Data
US 2022/0041394 A1 Feb. 10, 2022

(30) Foreign Application Priority Data
Dec. 21, 2018 (EP) .................................. 18215171

(51) Int. Cl.
*B65B 41/18* (2006.01)
*B65H 23/188* (2006.01)
(Continued)

(52) U.S. Cl.
CPC ......... *B65H 23/1882* (2013.01); *B65B 9/023* (2013.01); *B65B 9/20* (2013.01);
(Continued)

(58) Field of Classification Search
None
See application file for complete search history.

(56) References Cited

FOREIGN PATENT DOCUMENTS

| EP | 1 266 830 | 12/2002 |
| EP | 1 914 168 | 4/2008 |
(Continued)

OTHER PUBLICATIONS

International Search Report and Written Opinion issued in PCT/EP2019/085307 dated Mar. 19, 2020.
(Continued)

*Primary Examiner* — Leslie J Evanisko
(74) *Attorney, Agent, or Firm* — Knobbe, Martens, Olson & Bear LLP

(57) ABSTRACT

A method for printing a web of packaging material for packages holding liquid food products is provided. The method comprises receiving a web of packaging material, identifying a first register mark using a first sensor, determining a first register mark position based on the first register mark, determining a second register mark position area based on the first register mark position, identifying a second register mark within the second register mark position area using a second sensor and determining a second register mark position for the second register mark, determining a second area position of the second area based on the second register mark position, adjusting the web in relation to printer bars in accordance with the second area position, determining a second area position of the second area based on the second register mark position, and printing the second area by using the printer bars.

15 Claims, 4 Drawing Sheets

(51) Int. Cl.
  *B65B 9/02* (2006.01)
  *B65B 9/20* (2012.01)
  *B65B 57/02* (2006.01)
  *B65B 61/02* (2006.01)

(52) U.S. Cl.
  CPC .............. *B65B 41/18* (2013.01); *B65B 57/02* (2013.01); *B65B 61/025* (2013.01); *B65H 2301/5111* (2013.01); *B65H 2553/52* (2013.01); *B65H 2701/1244* (2013.01); *B65H 2801/69* (2013.01)

(56) References Cited

FOREIGN PATENT DOCUMENTS

| | | | |
|---|---|---|---|
| GB | 2 086 309 | 5/1982 | |
| WO | WO-03037722 A1 * | 5/2003 | ............. B65B 41/18 |
| WO | WO 2004/045953 | 6/2004 | |
| WO | WO 2016/207125 | 12/2016 | |

OTHER PUBLICATIONS

International Preliminary Report on Patentability and Written Opinion of the International Search Authority issued in PCT/EP2019/085307 dated Jul. 1, 2021.

* cited by examiner

METHOD FOR PRINTING A WEB OF PACKAGING MATERIAL AND AN APPARATUS THEREOF

TECHNICAL FIELD

The invention generally relates to the field of packaging technology, such as food packaging technology. More particularly, it is presented methods and apparatuses for printing a web of packaging material.

BACKGROUND ART

Today it is commonly known to use roll-fed packaging machines for different types of food products, e.g. milk. The roll-fed packaging machines, also referred to as filling machines, have several advantages. One is that a continuous production of packages makes it possible to achieve higher speeds compared to blanks-fed packaging systems. Another advantage is that by continuously filling a tube of packaging material and forming packages in a lower end of the tube, a risk that unwanted microorganisms enter the packages can be lowered.

The packaging material is today most often printed using so-called flexography in packaging material production centers, sometimes also referred to as converting factories, for carton-based packaging material. After being printed and in other ways prepared for holding food products, for example being laminated such that an inner plastic layer is formed between a carton layer of the packaging material and the food product, the packaging material is loaded on to a reel and shipped to a site where a packaging machine is placed.

Instead of having the packaging material printed, e.g. by using flexography, and prepared in the packaging material production centers, it has been suggested to use digital printing for printing the packaging material. An advantage of using digital printing instead of flexography is improved flexibility and another advantage that smaller batches may be printed in a cost efficient manner.

Even though it is known to use digital printing for printing the packaging material, there is a number of challenges that needs to be overcome. One of these challenges is printing accuracy, that is, being able to make sure that a printing décor is correctly provided on the packages.

SUMMARY

It is an object of the invention to at least partly overcome one or more of the above-identified limitations of the prior art. In particular, it is an object to provide a method and a printing module providing improved printing accuracy, especially for digital printing of packaging material.

According to a first aspect it is provided a method for printing a web of packaging material for packages holding liquid food products, wherein the web comprises a number of blanks placed after one another, wherein each blank corresponds to one package, wherein each of the blanks comprises a first area that is pre-printed and a second area to be printed. The method comprises receiving the web of packaging material, identifying a first register mark using a first sensor, determining a first register mark position based on the first register mark, determining a second register mark position area based on the first register mark position, identifying a second register mark within the second register mark position area using a second sensor and determining a second register mark position for the second register mark, determining a second area position of the second area based on the second register mark position, adjusting the web in relation to printer bars in accordance with the second area position, and printing the second area by using the printer bars.

The first sensor may comprise a first number of pixels, the second sensor may comprise a second number of pixels, wherein the second number of pixels is greater than the first number of pixels.

The second register mark may be invisible for a human eye in daylight conditions. For instance, the second register mark may be a water mark.

The step of receiving the web of packaging material may comprise receiving a reel holding the web of packaging material, reading reel information from an information tag attached to the reel, transferring the reel information to a server, and receiving a first register mark position setpoint and/or a second register mark position setpoint from the server.

The packaging material may be a carton-based packaging material comprising at least one carton layer, an inner plastic layer and an outer plastic layer, wherein the first register mark and the second register mark are provided in the at least one carton layer.

The first area may be off site printed.

The second area may be printed by using digital printing in a printing module placed upstream a filling machine arranged for producing the packages based on the web of packaging material.

According to a second aspect it is provided a printing module for printing a web of packaging material for packages holding liquid food products, wherein the web comprises a number of blanks placed after one another, wherein each blank corresponds to one package, wherein each of the blanks comprises a first area that is pre-printed and a second area to be printed, the printing module comprising a packaging material receiver arranged to receive the web of packaging material, a first sensor for identifying a first register mark, a processing device configured to determine a first register mark position based on the first register mark, determine a second register mark position area based on the first register mark position, a second sensor for identifying a second register mark within the second register mark position area, wherein the processing device is further configured to determine a second register mark position for the second register mark, and determine a second area position of the second area based on the second register mark position, printer bars arranged for printing the second area, and an adjustment device arranged to adjust the web in relation to the printer bars in accordance with the second area position.

The first sensor may comprise a first number of pixels, the second sensor may comprise a second number of pixels, wherein the second number of pixels is greater than the first number of pixels.

The second register mark may be invisible for a human eye in daylight conditions.

The packaging material receiver may comprise a reel holder arranged to receive a reel holding the web of packaging material, a tag reader arranged to read reel information from a tag attached to the reel, a data communications device configured to transfer the reel information to a server, and to receive a first register mark position setpoint and/or a second register mark position setpoint from the server.

The packaging material may be a carton-based packaging material comprising at least one carton layer, an inner plastic layer and an outer plastic layer, wherein the first register mark and the second register mark are provided in the at least one carton layer.

The first area may be off site printed.

The second area may be printed by using digital printing and wherein the printing module may be placed upstream a filling machine arranged for producing the packages based on the web of packaging material.

According to a third aspect it is provided a computer program product comprising instructions which, when executed on a computer, cause the computer to carry out the method according to the first aspect.

Still other objectives, features, aspects and advantages will appear from the following detailed description as well as from the drawings.

BRIEF DESCRIPTION OF THE DRAWINGS

Embodiments will now be described, by way of example, with reference to the accompanying schematic drawings, in which.

DETAILED DESCRIPTION

Figure 1:
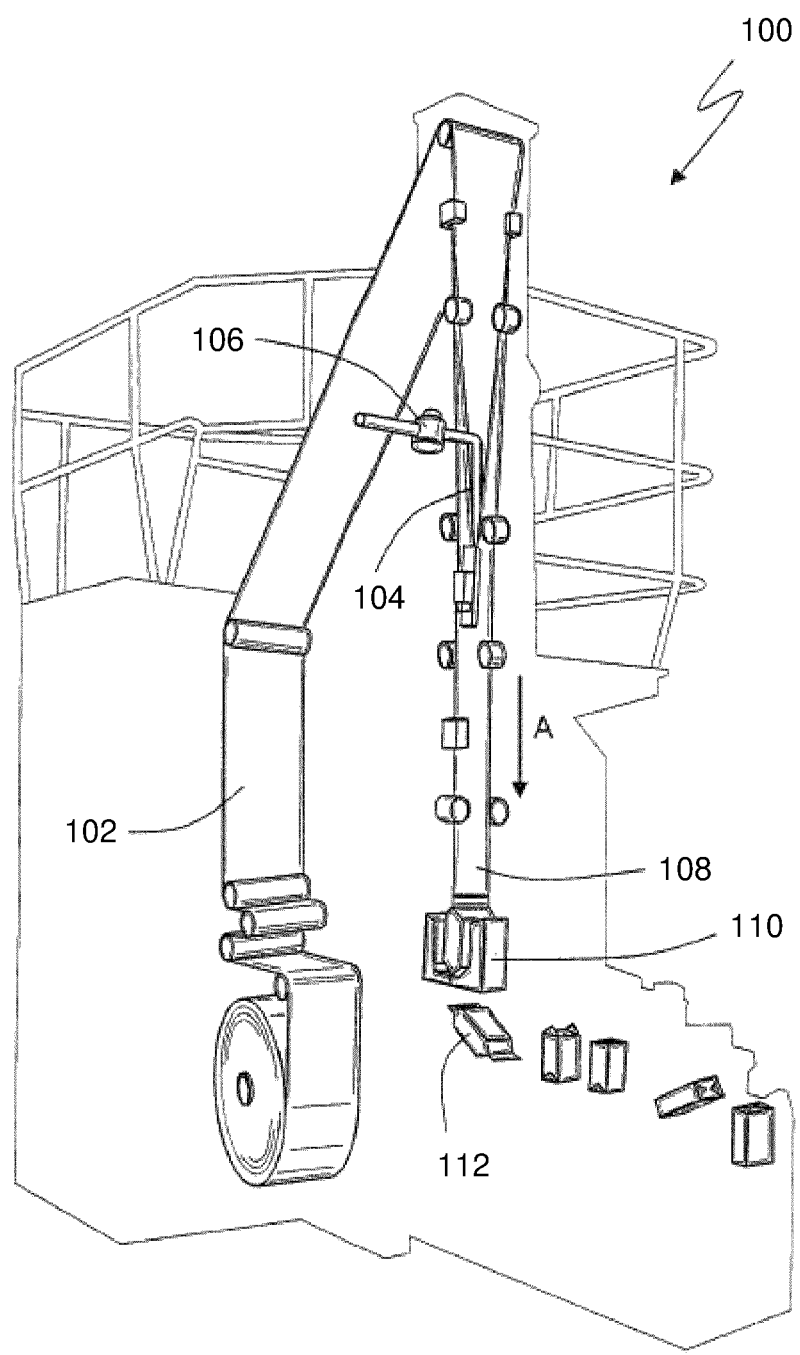
FIG. 1 is a general illustration of a roll-fed packaging machine.

With reference to FIG. 1, a packaging machine 100, sometimes also referred to as a filling machine, is generally illustrated by way of example. The packaging machine 100 is a roll-fed packaging machine used for packaging liquid food products in carton-based packages. Already in the 1940s this type of packaging machines was introduced by Tetra Pak, and it is today a well-known approach for packaging milk and other liquid food products in a safe and cost-efficient manner. The general approach can also be used for non-liquid food products, such as potato crisps.

Today, packaging material is often printed and prepared in packaging material production centers, also referred to as converting factories, and is shipped to a site where the packaging machine 100 is placed, e.g. a dairy. Usually the packaging material is loaded onto a reel before being transported. After arriving at the site, the reel is placed in the packaging machine as illustrated in FIG. 1.

During production a web 102 of packaging material can be fed from the reel through the packaging machine in a web feeding direction A. Even though not illustrated in FIG. 1, the packaging material may pass through a sterilization device, e.g. a hydrogen peroxide bath or an LVEB (Low-Voltage Electron Beam) station, for ensuring that the web 102 is free from unwanted microorganisms. Before providing the food product, a tube can be formed from the web 102 by forming a longitudinal sealing. The food product can be fed into the tube via a pipe 104 and a valve 106 may be used for regulating a flow through the pipe 104. A lower end 108 of the tube can be fed into a folding device 110 in which a transversal sealing is made, the tube is folded according to folding lines, also referred to as weakening lines, and cut off such that packages 112 can be formed. Even though the folding device 110 is illustrated as one single device, the folding device 110 may comprise a number of different devices.

Figure 2:
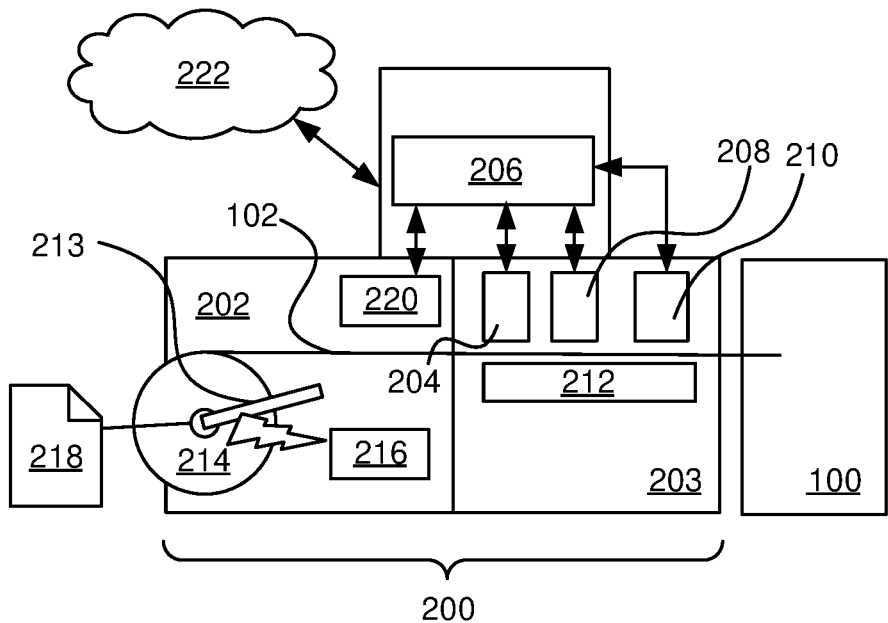
FIG. 2 is a general illustration of a printing module.

FIG. 2 generally illustrates a printing module 200 that can be placed upstream the packaging machine 100. An advantage with having the printing module 200 placed in this way is that the packaging material can be printed on site in part or in full, that is, printing and packaging can be performed at the same site. Another advantage can be that no or minor modifications of the packaging machine 100 are required. As an alternative, instead of having the printing module 200 placed as a separate apparatus upstream the packaging machine 100, the printing module 200 may be an integral part of the packaging machine 100, though not illustrated.

The printing module 200 can comprise a packaging material receiver 202 arranged to provide the web 102 of packaging material to a printing section 203. In the printing section 203, a first sensor 204 can be used for identifying a first register mark on the web 102 and a processing device 206 connected to the first sensor 204 can be used for determining a first register mark position based on the first register mark.

Identifying the first register mark may be considered to be a trigger signal for activating a second sensor 208 for identifying a second register mark. For instance, since a distance between the first register mark and the second register mark in the packaging material can be known and also since a web speed of the packaging material can be known, identifying the first register mark can provide for that a time period until the second register mark is to be captured can be determined.

The first register mark may be a barcode or other type of pattern that can quickly be read by the first sensor 204, which may be a scanner comprising a light source, a lens and a light sensor. The second register mark that can be read by the second sensor 208 may be more complex than the first register mark, e.g. the second register mark may be two-dimensional mark and the first register mark may be a one-dimensional mark, such as a one-dimensional bar code. The second register mark may for instance be a watermark invisible to a human eye in daylight conditions. As an effect, a second register mark position may be determined by a higher degree of position accuracy than a first register mark position, while less time may be needed for identifying the first register mark. Further, the first register mark may comprise binary color information, e.g. black and white, and the second register mark may comprise multi-color information. Further, the first sensor 204 may comprise a first number of pixels and the second sensor 208 may comprise a second number of pixels, wherein the second number of pixels is greater than the first number of pixels.

Since the second sensor 208 and the second register mark may be configured such that the second register mark position can be determined with a higher position accuracy than the first register mark position, but the first register mark using the first sensor may be identified faster than the second register mark position, a combination of the two provides for an efficient system for keeping track of a position of the web 102, thereby reducing the risk that a printing décor is provided inaccurately on the packages 112. For instance, the first sensor may be arranged to read in one direction, e.g. the web feeding direction A, and continuously, and the second sensor may be arranged to read in the same direction as the first sensor as well as a perpendicular direction, e.g. the web feeding direction A and a direction being perpendicular to the web feeding direction A, but not continuously in the same manner as the first sensor.

More specifically, after having identified the first register mark and determined the first register mark position, a second register mark position area can be determined. This may be determined by using information linked to the packaging material being used. The second register mark position area provides input to the second sensor 208 about where to look for the second register mark. After having identified the second register mark, the second register mark position may be determined. Put differently, the second register mark position area provides approximate information of where the second register mark is to be found, and when the second register mark is identified, the second register mark position can be determined with high position accuracy, i.e. an increased understanding of web placement can be achieved. The second register mark position can also be seen as an interval within which the second sensor 208 can find the second register mark.

Even though illustrated that the first and second register mark is provided in one and the same piece of packaging material that is to be formed into the package, it is also possible that the first and second register mark are provided on different pieces of packaging material. For instance, identifying a first register mark on piece N of the web of packaging material may provide information about when to capture the second register mark on piece N+5 of the web.

Further, instead of that the first and second register marks are two different types of marks provided on the same piece, an alternative is to use only one type of register mark and having one single register mark per piece. The single register mark of a first piece can then be the first register mark for triggering the activation of the second sensor for identifying the second register mark, which is the single register mark of a second piece.

The first and the second sensor 204, 208 may be so-called smart vision sensors having built-in processing devices for analyzing image data and identifying and/or determining position data for the first and/or the second register marks. Alternatively, the first and second sensors 204, 208 can be split in image capturing devices only capturing the image data and image processing means for processing the image data.

The packaging material receiver 202 may comprise a reel holder 213 for holding a reel 214 of packaging material. To provide for that information about the packaging material received efficiently and reliably, a tag reader 216 can be used. The tag reader 216 are configured for reading reel information 218, for illustrative purposes depicted as a document in FIG. 2, from a tag, such as an RFID tag, provided in the reel 214. The reel information 218 may be uploaded via a data communications device 220 to a server 222. In return, the server 222 may transfer information about e.g. relationship between the first register mark position and the second register mark position area for the packaging material being used. The server 222 may additionally comprise information about the packaging material that can be used for adjusting settings of the packaging machine 100, e.g. pressure to be used during transversal sealings.

Figure 3:
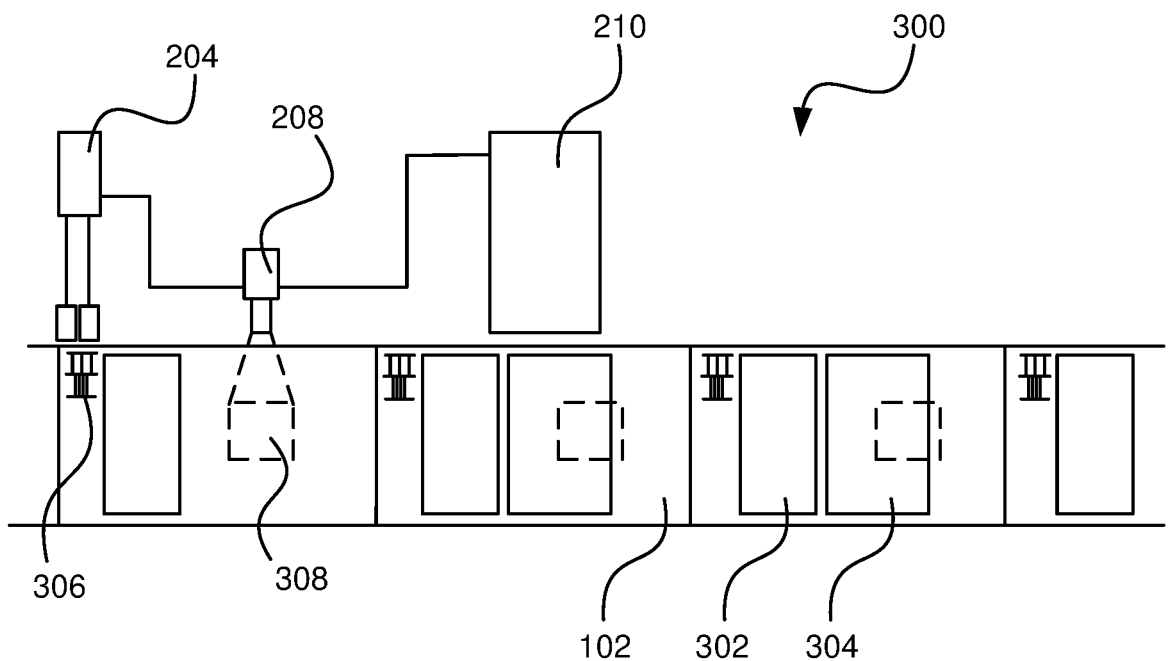
FIG. 3 is an example of a web of packaging material provided with first and second register marks.

FIG. 3 generally illustrates a sub-system 300 of the printing module 200 and the web 102 of packaging material in further detail. As described above, the first sensor 204, the second sensor 208 and the printer bars 210 may be used in combination for making sure that the printing accuracy can be improved. Adjustment data can be information used for adjusting settings of the packaging machine and can be determined by the second area position. The adjustment data can then be used to adjust and control the web in relation to the printer bars (210).

By way of example, the web 102 illustrated in FIG. 3 comprises for each piece that is intended to be formed into the package 112, a first area 302 and a second area 304. The first area 302 can be a pre-printed area, that is, the first area 302 can be printed e.g. by using flexography before the web 102 is loaded onto the reel 214, i.e. off site printed. The second area 304 may be printed in the printing module 203, i.e. on site printed.

The first register mark 306 is in the example illustrated in FIG. 3 a two-dimensional bar code. This barcode may also be used during the off site printing, that is, when the first area 302 is printed. The second register mark 308 may be a so-called water mark, i.e. a mark invisible to the human eye in daylight conditions.

The packaging material may be a carton-based packaging material comprising at least one carton layer, an inner plastic layer and an outer plastic layer. The first register mark 306 and the second register mark 308 may be provided in the at least one carton layer. An advantage with having them in this layer is that they are both protected by the outer plastic layer. Another advantage is that by having them both placed in the same layer, a risk that the first and second register mark 306, 308 are displaced with respect to each other can be reduced.

Figure 4:
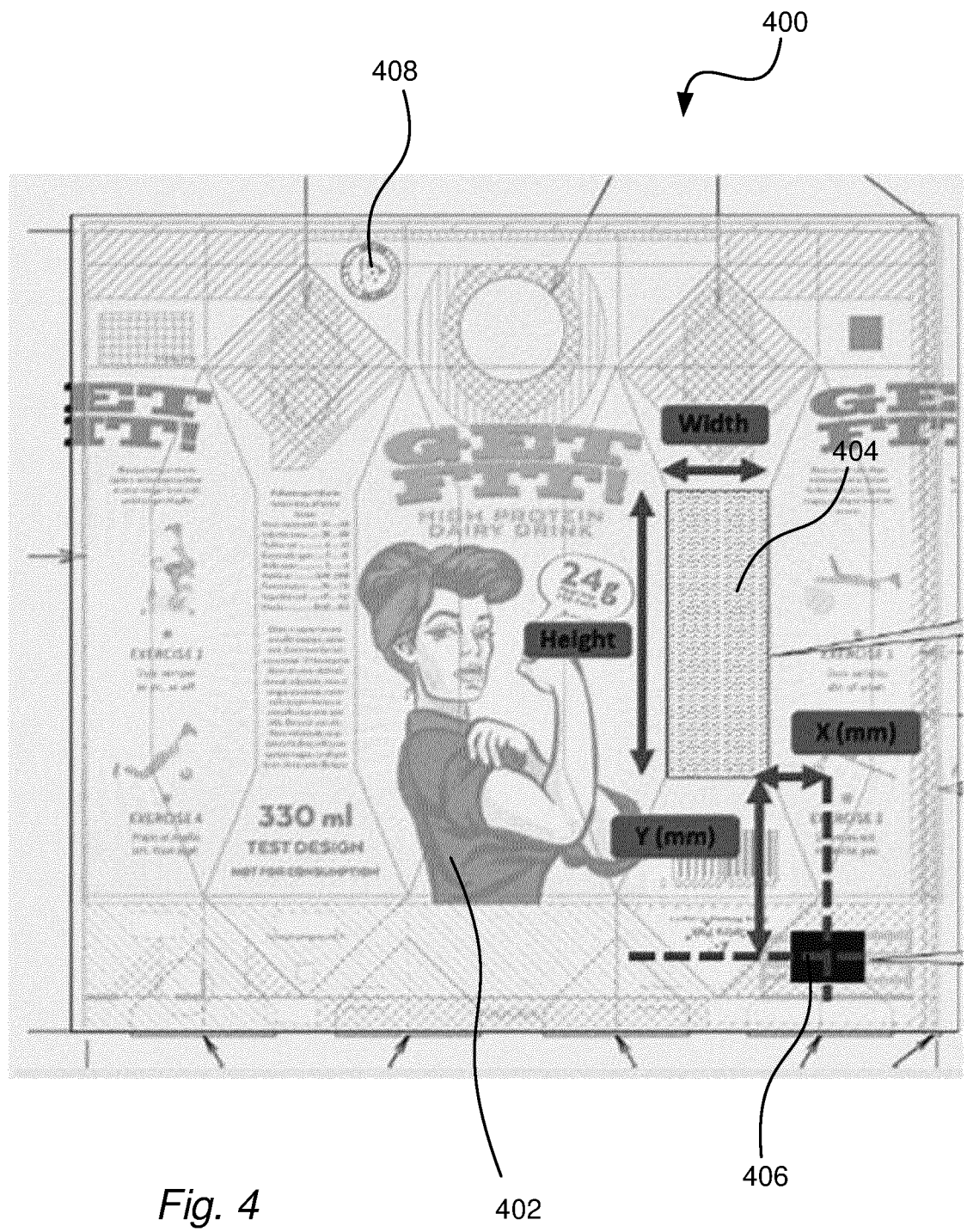
FIG. 4 is an example of a blank of packaging material, which may form part of the web, provided with first and second register marks.

FIG. 4 illustrates an example of a piece 400 of packaging material that can be formed into the package 112. In this particular example, the first area 402, which is off site printed, covers a main portion of the piece 400, and a minor portion of the piece is the second area 404, which is printed in the printing module 203, i.e. on site. However, it should be understood that this only an example and that the first area 402 and the second area 404 may have any size, and may also comprise of several sub-areas. The area could have a constant width and a constant length in form of a rectangle, but the width and the length could also vary over the area. The first register mark 406 is herein illustrated as a black box and the second register mark 408 is a graphical element, which is thereby serving dual purposes. It is both providing information to consumers and providing information to the printing module 203 on how the web is aligned.

Figure 5:
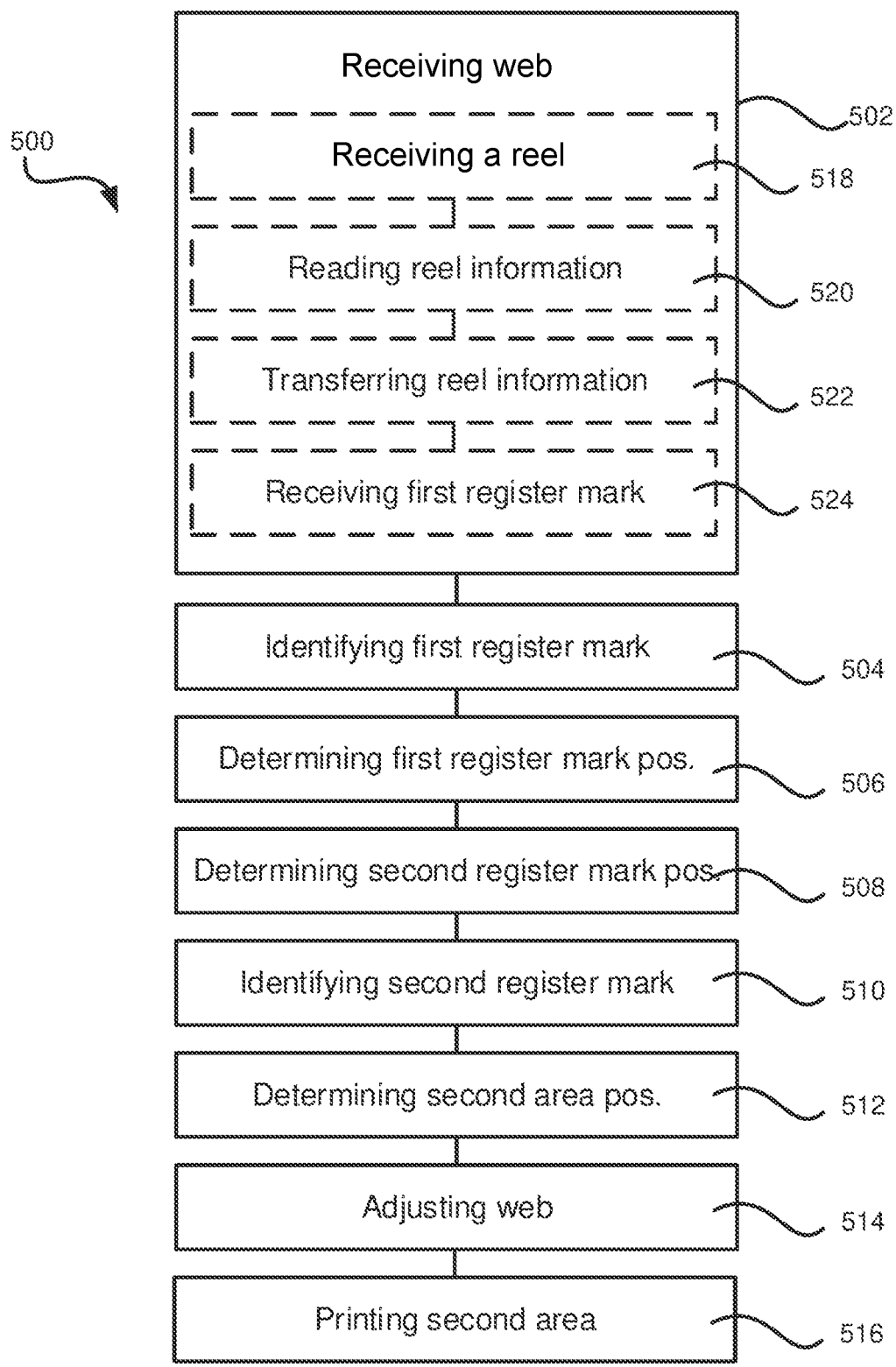
FIG. 5 is a flow chart illustrating a method for printing the web.

FIG. 5 is a flowchart 500 illustrating a method for printing the web 102. In a first step 502, the web 102 can be received. In a second step 504 the first register mark 306, 406 can be identified. Thereafter, in a third step 506, the first register mark position can be determined. Next, in a fourth step 508, the second register mark position area can be determined based on the first register mark position. In a sixth step 510 the second register mark 308, 408 can be identified and a second register mark position can be determined. Thereafter, in a seventh step 512, a second area position of the second area 304, 404 can be determined. In an eighth step 514 the web 102 can be adjusted in relation to the printer bars 210 in accordance with the second area position. Then, in a ninth step 516, the second area 304, 404 can be printed by using the printer bars 210.

The first step 502 may involve a number of sub-steps. In a first sub-step 518 the reel 214 may be received. Then, in a second sub-step 520 reel information 518 can be read from a tag attached to the reel 214. In a third sub-step 522, the reel information 218 can be transferred to the server 222. Then, in a fourth sub-step 524, the first register mark position setpoint and/or the second register mark position setpoint can be received from the server 222. Having this information the first and/or the second sensor have setpoint values to use a starting points for identifying the first and/or second register mark and in later steps the first and second register mark position.

From the description above follows that, although various embodiments of the invention have been described and shown, the invention is not restricted thereto, but may also be embodied in other ways within the scope of the subject-matter defined in the following claims.

The invention claimed is:

1. A method for printing a web of packaging material for packages holding liquid food products, wherein the web comprises a number of blanks placed after one another, wherein each blank corresponds to one package, and wherein each of the blanks comprises a first area that is pre-printed and a second area to be printed, the method comprising:
receiving the web of packaging material,
identifying a first register mark using a first sensor,
determining a first register mark position based on the first register mark,
determining a second register mark position area based on the first register mark position,
identifying a second register mark within the second register mark position area using a second sensor and determining a second register mark position for the second register mark,
determining a second area position of the second area based on the second register mark position,
adjusting the web in relation to printer bars in accordance with the second area position, and
printing the second area by using the printer bars.

2. The method according to claim 1, wherein the first sensor comprises a first number of pixels, the second sensor comprises a second number of pixels, wherein the second number of pixels is greater than the first number of pixels.

3. The method according to claim 1, wherein the second register mark is invisible for a human eye in daylight conditions.

4. The method according to claim 1, wherein the step of receiving the web of packaging material comprises:
receiving a reel holding the web of packaging material,
reading reel information from an information tag attached to the reel,
transferring the reel information to a server, and
receiving a first register mark position setpoint and/or a second register mark position setpoint from the server.

5. The method according to claim 1, wherein the packaging material is a carton-based packaging material comprising at least one carton layer, an inner plastic layer and an outer plastic layer, wherein the first register mark and the second register mark are provided in the at least one carton layer.

6. The method according to claim 1, wherein the first area is off-site printed.

7. The method according to claim 1, wherein the second area is printed by using digital printing in a printing module placed upstream from a filling machine arranged for producing the packages based on the web of packaging material.

8. A printing module for printing a web of packaging material for packages holding liquid food products, wherein the web comprises a number of blanks placed after one another, wherein each blank corresponds to one package, and wherein each of the blanks comprises a first area that is pre-printed and a second area to be printed, the printing module comprising:
a packaging material receiver arranged to receive the web of packaging material,
a first sensor for identifying a first register mark,
a processing device configured to determine a first register mark position based on the first register mark, determine a second register mark position area based on the first register mark position,
a second sensor for identifying a second register mark within the second register mark position area,
wherein the processing device is further configured to determine a second register mark position for the second register mark, and determine a second area position of the second area based on the second register mark position,
printer bars arranged for printing the second area, and
an adjustment device arranged to adjust the web in relation to the printer bars in accordance with the second area position.

9. The printing module according to claim 8, wherein the first sensor comprises a first number of pixels, the second sensor comprises a second number of pixels, and wherein the second number of pixels is greater than the first number of pixels.

10. The printing module according to claim 8, wherein the second register mark is invisible for a human eye in daylight conditions.

11. The printing module according to claim 8, wherein the packaging material receiver comprises:
a reel holder arranged to receive a reel holding the web of packaging material,
a tag reader arranged to read reel information from a tag attached to the reel, and
a data communications device configured to transfer the reel information to a server, and to receive a first register mark position setpoint and/or a second register mark position setpoint from the server.

12. The printing module according to claim 8, wherein the packaging material is a carton-based packaging material comprising at least one carton layer, an inner plastic layer and an outer plastic layer, and wherein the first register mark and the second register mark are provided in the at least one carton layer.

13. The printing module according to claim 8, wherein the first area is off-site printed.

14. The printing module according to claim 8, wherein the second area is printed by using digital printing, and wherein the printing module is placed upstream from a filling machine arranged for producing the packages based on the web of packaging material.

15. A non-transitory computer readable medium storing instructions which, when executed on a computer, cause the computer to carry out the method according to claim 1.

* * * * *